Patented Nov. 2, 1948

2,452,770

UNITED STATES PATENT OFFICE 2,452,770

COCOA-SUGAR COMPOSITION

Louis Lang, New York, N. Y., assignor to The National Sugar Refining Company, New York, N. Y., a corporation of New Jersey No Drawing. Application September 6, 1944, Serial No. 552,929

8 Claims. (Cl. 99—26)

This invention relates to a novel cocoa sugar composition and to a method of making the same.

Mixtures of cocoa and sugar, with or without other ingredients such as milk solids and the like, are well known in the art. It has been found, however, that cocoa sugar compositions having an enhanced dispersibility in liquid media, such as hot or cold water or milk, and producing a dispersion of an enhanced smoothness and palatability may be obtained by admixing cocoa with a sugar syrup at a temperature of from about 250° to 320° F. and a concentration which will solidify on cooling and subjecting the mixture to continuous beating while cooling. When cocoa powder is added to hot sugar syrup at temperatures between 250° to 320° F., the mixture on cooling under continuous vigorous stirring or beating passes through a temperature range in which a rapid evolution of water vapor takes place while very finely divided sugar crystallizes in and around the cocoa particles, while the cocoa substance is apparently modified in such manner as to substantially enhance its dispersibility in liquids. In general, it is preferable to preheat the cocoa powder, for example, to about 150° F. before admixing it with the hot sugar syrup to avoid cooling the syrup too quickly to the critical temperature range.

The rapid evolution of water vapor during the crystallization of the sugar is believed to be due to the formation of mother liquors which, because of their increased water content, have a boiling point lower than the temperature of the crystallizing mass. This effect is probably enhanced by exothermic development of heat during the crystallization.

The proportion of cocoa to sugar is not critical and, in general, may be from 10 to 40% by weight of the sugar. The only limitation as to fat content of the cocoa arises with the purpose that this cocoa powder is to be put to. If the cocoa powder is to be stirred by hand into cold beverages, then the fat content should preferably not exceed 10 to 12%. However, if the cocoa powder is to be used for the production of hot beverages then the cocoa may have any fat content. The cocoa may also have any fat content if it is to be stirred into cold beverages mechanically as is the practice at lunch counters and soda fountains.

The following example is illustrative of the method of the invention:

A sugar syrup is brought to a temperature of about 280° F. and a concentration of about 90–96° Brix, preferably within such a time that no substantial amount of invert sugar is formed, and placed in a beating machine. About 25 per cent of cocoa, based on the weight of the sugar, is then added with continuous beating. The cocoa is preferably preheated to about 150° F. The beating is continued and in a relatively short time a copious evolution of water vapor develops from the batch. This vapor should be blown away or drawn off so that it does not recondense and drip back into the batch. On continued beating the mass becomes dry, homogeneous and powdery. Beating preferably is continued until the product is cool.

The operation may be carried out in a continuous process in which case the hot syrup is fed continuously from a cooker into a horizontal beater. The cocoa, either cold or preheated, is introduced into the beater adjacent to the point where the syrup enters the beater, and as the mass progresses along the beater, cooling, crystallizing and the flashing off of steam take place along the length of the beater. At the end of the beater farthest from the feed end the dry, homogeneous cocoa sugar powder is discharged.

The rate of cooling of the batch or of the continuously operated beater may be regulated by suitable insulation or by the provision of a cooling medium, for example, in a jacket, so that the evolution of water vapor is kept under control and the cocoa is not subjected to the high temperature any longer than is necessary to remove a substantial amount of the water content and to modify the cocoa substance. The mixture of cocoa and hot sugar syrup should not be allowed to cool too rapidly through the critical temperature range in which the evolution of water vapor takes place, and on the other hand the mixture should be cooled down rapidly enough to avoid altering the taste of the fat content of the cocoa. The amount of insulation or cooling required will depend, in general, on the initial temperature of the sugar syrup and the size of the batch, or continuously operating beater, in which the operation is carried out.

Other crystallizable sugars may be used in place of all or a part of the sucrose in this method, and any desired additional ingredients such as milk solids may be added to the composition.

It will be seen that the process of the invention utilizes the exothermic development of heat and the rapid evaporation of water arising from the formation of mother liquors having a lower boiling point than the temperature of the crystallizing mass, during the crystallization under agitation of hot sugar syrups of a high degree of concentration to remove water from the sugar-cocoa mixture and to modify the cocoa substance to enhance the dispersibility in liquids of the cocoa-sugar compositions, while effecting a more intimate interpenetration of the sugar in the cocoa substance.

I claim:

1. Process for the production of a cocoa product which comprises adding cocoa to a sugar syrup at a temperature of from about 250° to 320° F. with continuous beating, and continuing the beating until a dry, powdery product is obtained.

2. Process for the production of a cocoa product which comprises adding cocoa to a sugar syrup at a temperature of about 280° F. with continuous beating, and continuing the beating until a dry, powdery product is obtained.

3. Process for the production of a cocoa product which comprises preheating cocoa to about 150° F., adding the preheated cocoa to a sugar syrup at a temperature of from about 250° to 320° F. with continuous beating, and continuing the beating until a dry, powdery product is obtained.

4. Process for the production of a cocoa product which comprises preheating cocoa to about 150° F., adding the preheated cocoa to a sugar syrup at a temperature of about 280° F. with continuous beating, and continuing the beating until a dry, powdery product is obtained.

5. Process for the production of a cocoa product which comprises concentrating sugar syrup to a concentration which will solidify on cooling, adding cocoa to the hot syrup at a temperature of from about 250° to 320° F. with continuous beating, and continuing the beating until the evolution of water vapor ceases and a dry, powdery product is obtained.

6. Process for the production of a cocoa product which comprises concentrating sugar syrup to a concentration of 90-96° Brix, adding cocoa to the hot syrup at a temperature of from about 250° to 320° F., with continuous beating, and continuing the beating until the evolution of water vapor ceases and a dry, powdery product is obtained.

7. Process for the production of a cocoa product which comprises concentrating sugar syrup to a concentration which will solidify on cooling, adding preheated cocoa to the hot syrup at a temperature of from about 250° to 320° F., with continuous beating, and continuing the beating until the evolution of water vapor ceases and a dry, powdery product is obtained.

8. Process for the production of a cocoa product which comprises concentrating sugar syrup to a concentration which will solidify on cooling at a rate sufficiently rapid that no substantial amount of invert sugar is formed, adding cocoa to the hot syrup at a temperature of from about 250° to 320° F., with continuous beating, and continuing the beating until the evolution of water vapor ceases and a dry, powdery product is obtained.

LOUIS LANG.

REFERENCES CITED

The following references are of record in the file of this patent:

UNITED STATES PATENTS

| Number | Name | Date |
| --- | --- | --- |
| 1,076,122 | Hunter | Oct. 21, 1913 |
| 1,311,844 | Wood | July 29, 1919 |
| 2,177,344 | Middleton | May 17, 1938 |
| 2,179,130 | Middleton | Nov. 7, 1939 |